United States Patent
Usuda et al.

(10) Patent No.: US 12,190,593 B2
(45) Date of Patent: Jan. 7, 2025

(54) IMAGING DEVICE

(71) Applicant: Panasonic Intellectual Property Management Co., Ltd., Osaka (JP)

(72) Inventors: Manabu Usuda, Hyogo (JP); Shinzo Koyama, Osaka (JP); Yuki Sugiura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 18/331,532

(22) Filed: Jun. 8, 2023

(65) Prior Publication Data

US 2023/0316765 A1     Oct. 5, 2023

Related U.S. Application Data

(63) Continuation of application No. PCT/JP2021/042462, filed on Nov. 18, 2021.

(30) Foreign Application Priority Data

Dec. 22, 2020 (JP) .................................. 2020-212815

(51) Int. Cl.
*G06V 20/52* (2022.01)
*G06T 7/11* (2017.01)
(Continued)

(52) U.S. Cl.
CPC ................ *G06V 20/52* (2022.01); *G06T 7/11* (2017.01); *G06T 7/50* (2017.01); *G06T 7/70* (2017.01);
(Continued)

(58) Field of Classification Search
CPC ...... G06V 20/58; G06V 20/52; G06V 10/761; G06V 2201/07; G06T 7/70; G06T 7/50;
(Continued)

(56) References Cited

U.S. PATENT DOCUMENTS

| | | | | |
|---|---|---|---|---|
| 8,300,892 B2 * | 10/2012 | Iwasaki | ................... | G06T 7/215 382/103 |
| 8,749,631 B2 * | 6/2014 | Saito | ...................... | G08G 1/166 348/143 |
| 2015/0319422 A1 | 11/2015 | Fereyre et al. | | |

FOREIGN PATENT DOCUMENTS

| | | |
|---|---|---|
| JP | 6320406 B2 | 5/2018 |
| JP | 2020-015419 A | 1/2020 |

OTHER PUBLICATIONS

International Search Report dated Jan. 11, 2022 issued in International Patent Application No. PCT/JP2021/042462, with English translation.

* cited by examiner

*Primary Examiner* — Sherrie Hsia

(74) *Attorney, Agent, or Firm* — Rimon P.C.

(57) ABSTRACT

It is made possible to monitor the periphery of a target object more accurately, using an imaging device that generates distance image data by sub-range analysis. For a target object present across first and second distance zones adjacent to each other, a first position at a near end position of the first distance zone, a second position at a boundary position between the first and second distance zones, and a third position indicating the position at a far end position of the second distance zone are obtained. Location data of the target object is generated based on location information of the second position with respect to a straight line connecting the first position and third position.

8 Claims, 8 Drawing Sheets

(51) Int. Cl.
*G06T 7/50* (2017.01)
*G06T 7/70* (2017.01)
*G06V 10/74* (2022.01)
*G06V 20/58* (2022.01)

(52) U.S. Cl.
CPC .. *G06V 10/761* (2022.01); *G06T 2207/10028* (2013.01)

(58) Field of Classification Search
CPC ............. G06T 7/11; G06T 2207/10028; G06T 2207/30236
USPC .................................. 348/143; 382/103, 106
See application file for complete search history.

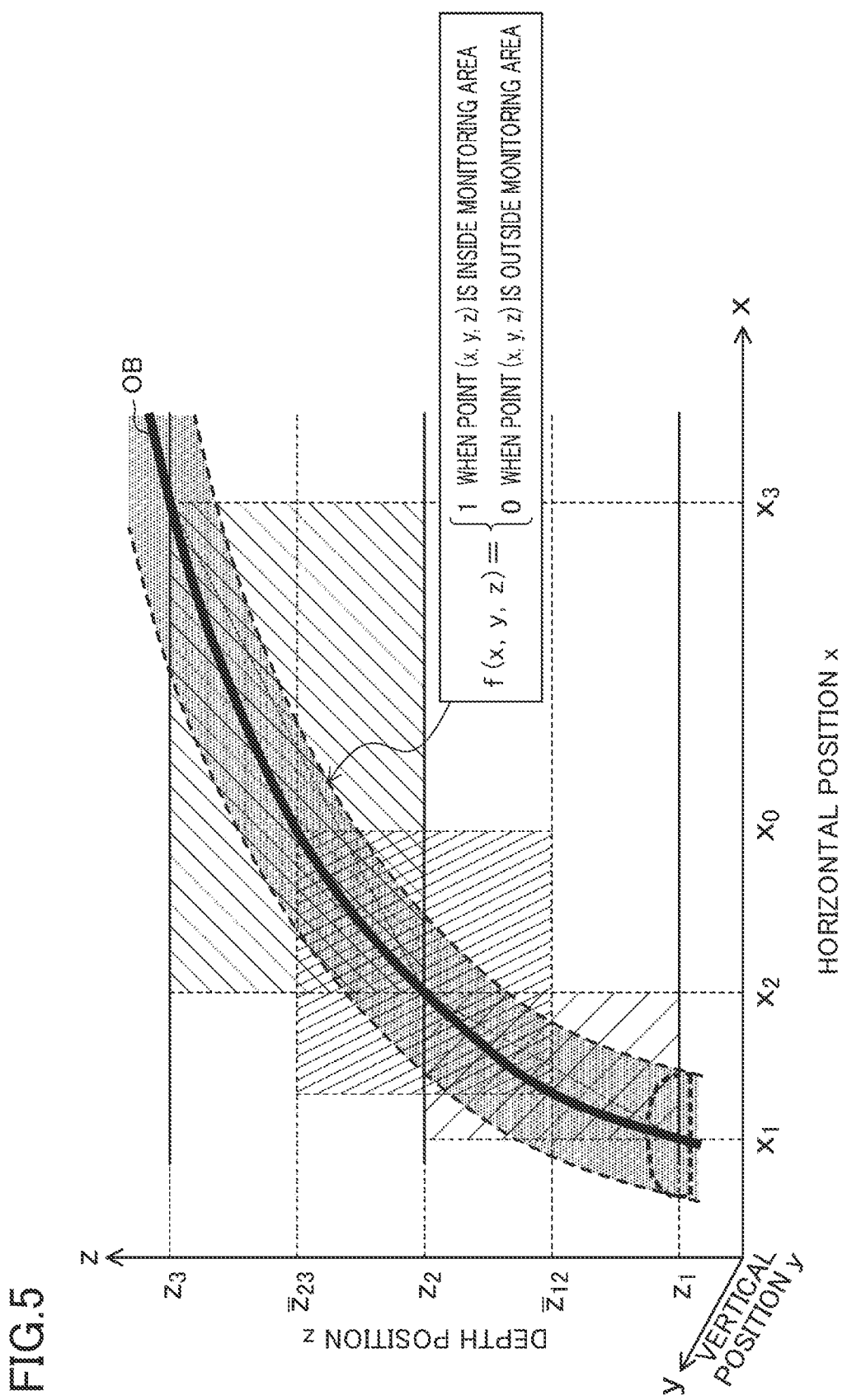

FIG.7

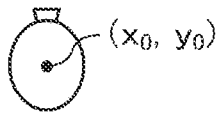

f(x, y, z) : MONITORING AREA FUNCTION $P(x_0, y_0)$ : PROBABILITY THAT SMALL OBJECT IS INSIDE MONITORING AREA WITH RESPECT TO REPRESENTATIVE POINT $(x_0, y_0)$ $P_{alarm}$ : ALARM THRESHOLD IF $P(x_0, y_0) \geq P_{alarm}$, ISSUE ALARM IF $P(x_0, y_0) < P_{alarm}$, ISSUE NO ALARM

FIG.8

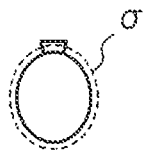

f(x, y, z) : FUNCTION DEFINING MONITORING AREA $P(\sigma)$ : PROBABILITY THAT SMALL OBJECT IS INSIDE MONITORING AREA WITH RESPECT TO AREA $\sigma$ $P_{alarm}$ : ALARM THRESHOLD IF $P(\sigma) \geq P_{alarm}$, ISSUE ALARM IF $P(\sigma) < P_{alarm}$, ISSUE NO ALARM

IMAGING DEVICE

CROSS-REFERENCE TO RELATED APPLICATIONS

This is a continuation of International Application No. PCT/JP2021/042462 filed on Nov. 18, 2021, which claims priority to Japanese Patent Application No. 2020-212815 filed on Dec. 22, 2020. The entire disclosures of these applications are incorporated by reference herein.

BACKGROUND

The present disclosure relates to an imaging device that generates distance image data by sub-range analysis.

Imaging devices and image processing devices are used to monitor obstacles.

Japanese Unexamined Patent Publication No. 2020-15419 discloses mounting a laser scanner or any other suitable device on a moving body, such as a railroad vehicle or a maintenance vehicle, to obtain, while the moving body moves on a railway track, three-dimensional point cloud data indicating the shapes of features along the railway track, and processing information on the three-dimensional point cloud data to calculate the location of a reference structure. In Japanese Unexamined Patent Publication No. 2020-15419, the accuracy in detecting an absolute location of the three-dimensional point cloud is improved based on summary statistics.

Japanese Patent No. 6320406 discloses calculating an average distance through weighted distance interpolation among a plurality of zones.

SUMMARY

The object detection using an aggregate of point cloud data as in Japanese Unexamined Patent Publication No. 2020-15419 has the difficulty in determining the shapes of distant objects. On the other hand, calculating a distance simply through weighting for pixel data as in Japanese Patent No. 6320406 lacks the accuracy in measuring the distance.

In view of the foregoing background, it is an objective of the present disclosure to enable monitoring of the periphery of a target object more accurately, using an imaging device that generates distance image data by sub-range analysis.

An imaging device according to an aspect of the present disclosure includes: a detector including a camera for distance measurement; and a controller configured to divide a target space into a plurality of distance zones based on distances in a depth direction from a reference point and generate, from an output of the detector, distance image data indicating the respective distance zones, the controller including: an input section configured to receive setting information of the distance zones, the setting information including the number of the distance zones and a near end position and a far end position of each of the distance zones; a distance image generator configured to generate the distance image data from the output of the detector, using the setting information of the distance zones input to the input section; an extractor configured to extract a target object present across first and second distance zones adjacent to each other; and a calculator configured to calculate, based on the distance image data, target object location data estimating a location and a shape of the target object extracted by the extractor, the calculator being configured to obtain a first position, a second position, and a third position on a plane formed by the depth direction and a horizontal direction perpendicular to the depth direction, the first position indicating the position of the target object at the near end position of the first distance zone, the second position indicating the position of the target object at a boundary position between the first and second distance zones, the third position indicating the position of the target object at the far end position of the second distance zone, and generate, on the plane, the target object location data based on location information of the second position with respect to a straight line connecting the first position and the third position.

The present disclosure enables accurate monitoring of the periphery of a target object, using an imaging device that generates distance image data by sub-range analysis.

BRIEF DESCRIPTION OF THE DRAWINGS

FIG. 5 is a diagram showing an example setting of a monitoring area.

FIG. 7 is an example method of calculating the probability that an object is in a monitoring area.

FIG. 8 is an example method of calculating the probability that an object is in a monitoring area.

DETAILED DESCRIPTION

Summary

Figure 1:
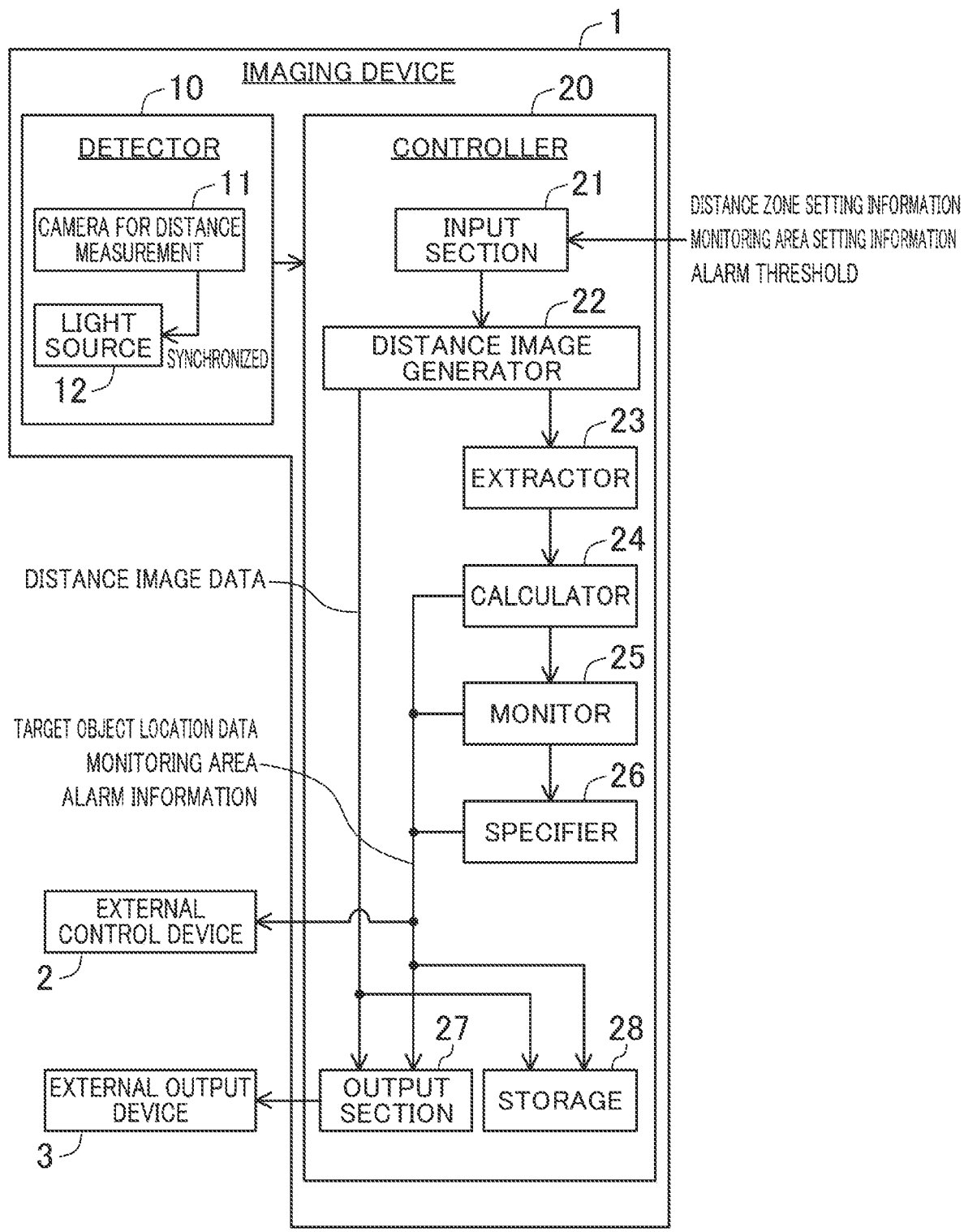
FIG. 1 is a block diagram showing a configuration of an imaging device according to an embodiment.

An imaging device according to a first aspect of the present disclosure includes: a detector including a camera for distance measurement; and a controller configured to divide a target space into a plurality of distance zones based on distances in a depth direction from a reference point and generate, from an output of the detector, distance image data indicating the respective distance zones, the controller including: an input section configured to receive setting information of the distance zones, the setting information including the number of the distance zones and a near end position and a far end position of each of the distance zones; a distance image generator configured to generate the distance image data from the output of the detector, using the setting information of the distance zones input to the input section; an extractor configured to extract a target object present across first and second distance zones adjacent to each other; and a calculator configured to calculate, based on the distance image data, target object location data estimating a location and a shape of the target object extracted by the extractor, the calculator being configured to obtain a first position, a second position, and a third position on a plane formed by the depth direction and a horizontal direction perpendicular to the depth direction, the first position indicating the position of the target object at the near end position of the first distance zone, the second position indicating the position of the target object at a boundary position between the first and second distance zones, the third position indicating the position of the target object at the far end position of the second distance zone, and generate, on the plane, the target object location data based on location information of the second position with respect to a straight line connecting the first position and the third position.

With this configuration, for the target object present across the first and second distance zones adjacent to each other, the first position at the near end position of the first distance zone, the second position at the boundary position between the first and second distance zones, and the third position indicating the position at the far end position of the second distance zone are obtained. The target object location data is generated based on the location information of the second position with respect to the straight line connecting the first position and the third position. It is thus possible to express the location and shape of the target object even in a curved shape more precisely. Hence, it is possible to generate the location data of the target object present across the adjacent first and second distance zones more accurately.

An imaging device according to a second aspect of the present disclosure includes: a detector including a camera for distance measurement; and a controller configured to divide a target space into a plurality of distance zones based on distances in a depth direction from a reference point and generate, from an output of the detector, distance image data indicating the respective distance zones, the controller including: an input section configured to receive setting information of the distance zones, the setting information including the number of the distance zones and a near end position and a far end position of each of the distance zones; a distance image generator configured to generate the distance image data from the output of the detector, using the setting information of the distance zones input to the input section; an extractor configured to extract a target object present across first and second distance zones adjacent to each other; and a calculator configured to calculate, based on the distance image data, target object location data estimating a location and a shape of the target object extracted by the extractor, the calculator being configured to set a third distance zone including a boundary position between the first and second distance zones, obtain a first position, a second position, a third position, a fourth position, and a fifth position on a plane formed by the depth direction and a horizontal direction perpendicular to the depth direction, the first position indicating the position of the target object at the near end position of the first distance zone, the second position indicating the position of the target object at the boundary position between the first and second distance zones, the third position indicating the location of the target object at the far end position of the second distance zone, the fourth position indicating the position of the target object at the near end position of the third distance zone, the fifth position indicating the position of the target object at the far end position of the third distance zone, and generate, on the plane, the target object location data based on location information of the fourth position with respect to a straight line connecting the first position and the second position and location information of the fifth position with respect to a straight line connecting the second position and the third position.

With this configuration, the third distance zone is set which includes the boundary position between the first and second distance zones. For the target object present across the first and second distance zones adjacent to each other, the first position at the near end position of the first distance zone, the second position at the boundary position between the first and second distance zones, and the third position indicating the position at the far end position of the second distance zone are obtained. In addition, the fourth position at the near end position of the third distance zone and the fifth position at the far end position of the third distance zone are obtained. The target object location data is generated based on the location information of the fourth position with respect to the straight line connecting the first position and the second position and the location information of the fifth position with respect to the straight line connecting the second position and the third position. It is thus possible to express the location and shape of the target object even in a curved shape more precisely. Hence, it is possible to generate the location data of the target object present across the adjacent first and second distance zones more accurately.

The imaging device of the first or second aspect may further include: a monitor configured to set a monitoring area based on a monitoring area function input to the input section with reference to the target object location data.

With this configuration, a desired monitoring area can be set around the target object present across the adjacent first and second distance zones.

Further, the input section may allow input of a threshold to issue an alarm due to presence of an obstacle in the monitoring area, and the imaging device may further include a specifier configured to calculate, when an object that can be an obstacle is recognized in the target space, a probability value by summation of the monitoring area function in the depth direction with respect to a representative point of the object on a vertical plane and compare the probability value to the threshold input to the input section so as to determine whether to issue the alarm.

Accordingly, whether to issue the alarm can be determined accurately when an object that can be an obstacle is recognized.

Alternatively, the input section may be configured to allow input of a threshold to issue an alarm due to presence of an obstacle in the monitoring area, and the imaging device may further include a specifier configured to calculate, when an object that can be an obstacle is recognized in the target space, a probability value by summation of the monitoring area function in the depth direction with respect to an area of the object on a vertical plane and compare the probability value to the threshold input to the input section so as to determine whether to issue the alarm.

Accordingly, whether to issue the alarm can be determined accurately when an object that can be an obstacle is recognized.

An embodiment will be described in detail with reference to the drawings.

The embodiment described below shows a general or specific example. The numerical values, shapes, materials, components, the arrangement and connection of the components, steps, the order of the steps, etc., shown in the following embodiment are mere examples and are not intended to limit the scope of the present disclosure. Among the components described in the following embodiment, those not recited in the independent claims which embody the broadest concept of the present disclosure will be described as optional components.

Embodiment

FIG. 1 is a block diagram showing a configuration of an imaging device according to an embodiment. An imaging device 1 shown in FIG. 1 employs what is called "sub-range analysis." Specifically, the imaging device 1 divides a space to be imaged into a plurality of distance zones based on distances in a depth direction from a reference point and outputs distance image data indicating the respective distance zones.

A detector 10 obtains distance image data based on what is called a time-of-flight (TOF) method and includes a camera 11 for distance measurement by the TOF method and a light source 12 synchronized with the camera 11.

A controller 20 divides a target space into a plurality of distance zones based on distances in a depth direction from a reference point and generates, from an output of the detector 10, distance image data indicating the respective distance zones. In this embodiment, the controller 20 includes an input section 21, a distance image generator 22, an extractor 23, a calculator 24, a monitor 25, a specifier 26, an output section 27, and a storage 28.

The input section 21 allows input of setting information on the distance zones, which includes the number of the distance zones and the near end position and the far end position of each distance zone. The input section 21 also allows input of setting information on a monitoring area, which will be described later, and a threshold to issue an alarm due to the presence of an obstacle in the monitoring area. The distance image generator 22 generates distance image data indicating the distance zones from the output of the detector 10, using the setting information on the distance zones input to the input section 21.

The extractor 23 extracts, from the distance image data, a target object present across a plurality of distance zones adjacent to each other. The target object extracted herein is a rail, a station platform, a curb, or a wall, for example. In this embodiment, it is possible to set a monitoring area, such as a structure gauge, around the target object extracted herein. The calculator 24 calculates target object location data, which is data estimating the location and shape of the target object extracted by the extractor 23, using the distance image data. The monitor 25 and the specifier 26 will be described later.

The output section 27 outputs the distance image data, as well as information, such as the target object location data, the monitoring area, and the alarm information, to an external output device 3, such as a display or a printer. The storage 28 stores the distance image data, as well as the information, such as the target object location data, the monitoring area, and the alarm information. The information, such as the target object location data, the monitoring area, and the alarm information, is output to an external control device 2, too.

Here, a problem in employing sub-range analysis will be described.

Figure 2:
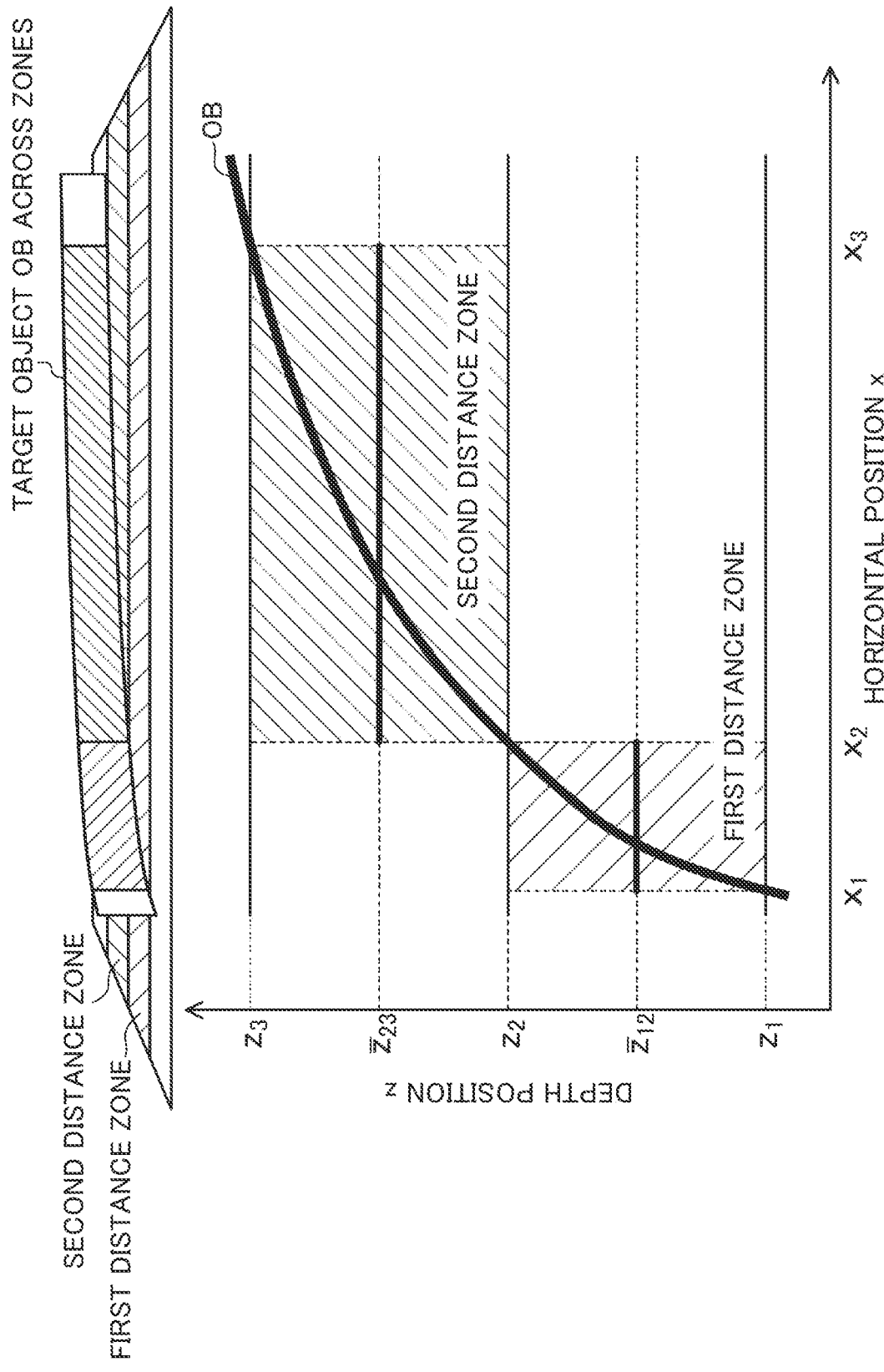
FIG. 2 is a diagram for explaining a problem in employing sub-range analysis.

FIG. 2 illustrates a case in which a certain target object OB, such as a railway track and a guardrail, is present across a plurality of distance zones in an imaging space. The lower part of FIG. 2 shows the location and shape of the target object OB shown in the upper part of FIG. 2 in plane coordinates including the depth direction and the horizontal direction perpendicular to the depth direction. The region between depth positions z1 and z2 is a first distance zone, whereas the region between depth positions z2 and z3 is a second distance zone. The target object OB is present across the first and second distance zones and curves gently.

One distance zone is treated as a single distance. In the lower part of FIG. 2, the first distance zone is treated as a representative distance /z12, while the second distance zone is treated as a representative distance /z23. An intermediate distance between z1 and z2, for example, may be selected as the /z12. The same applies to /z23. Accordingly, the target object OB present across the first and second distance zones is considered being at the distance /z12 between the horizontal positions x1 and x2 and at the distance /z23 between the horizontal positions x2 and x3, regardless of the shape. This causes a problem in the sub-range analysis that the location and shape of the target object OB are detected less accurately.

In order to solve this problem, it is conceivable, for example, to narrow the width of each distance zone and increase the distance resolution. However, narrowing the width of each distance zone results in an enormous amount of data in an attempt to detect from near positions to far positions and is thus difficult to achieve in reality.

To address the problem, this embodiment employs the following methods.

<First Method>

As shown in FIG. 3, first, second, and third positions with respect to the adjacent first and second distance zones are obtained: the first position is the position of the target object OB at the near end position z1 of the first distance zone; the second position is the position of the target object OB at the boundary position z2 between the first and second distance zones; and the third position is the position of the target object OB at the far end position z3 of the second distance zone. It is then determined on which side of the straight line (i.e., straight line 3) connecting the first position and the third position in the horizontal direction the second position is located. That is, the location information of the second position with respect to the straight line 3 is obtained.

Figure 3A:
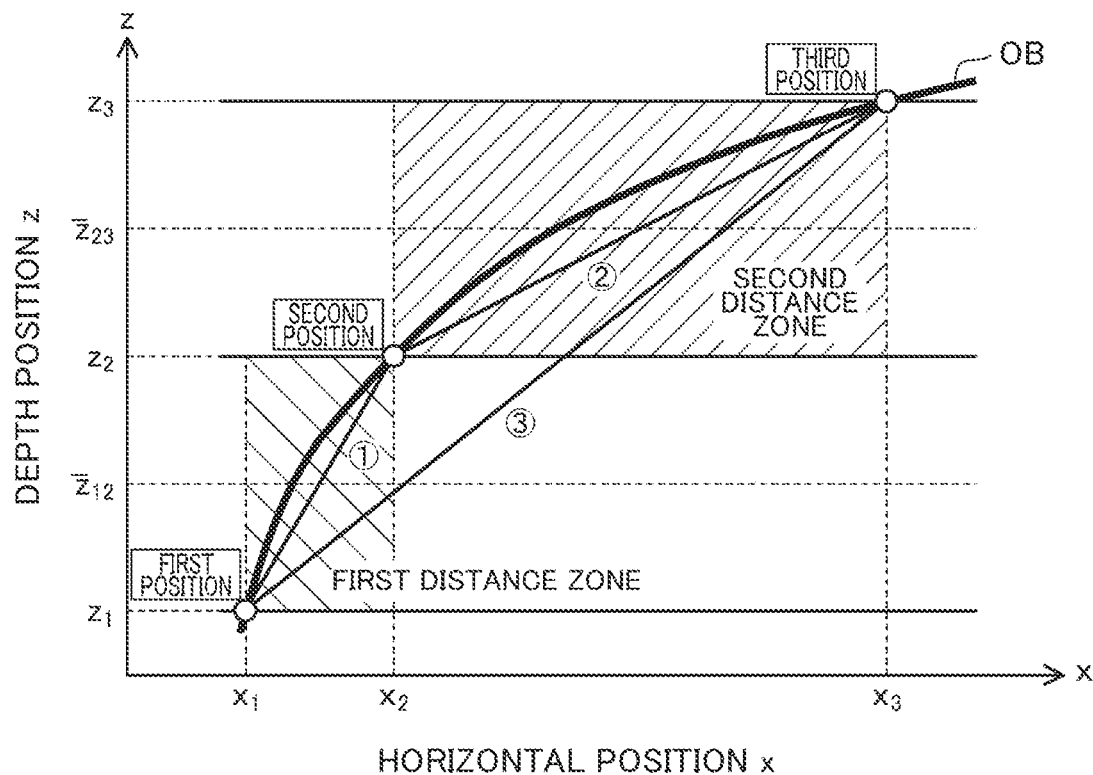
FIGS. 3A and 3B are diagrams showing a first method according to the embodiment.

In the example of FIG. 3A, the second position is on the left of the straight line 3. In this case, the straight line (i.e., straight line 1) connecting the first position and the second position and the straight line (i.e., straight line 2) connecting the second position and the third position are also on the left of the straight line 3. The location data of the target object OB is generated by interpolating between the first position and the second position and between the second position and the third position, with a function of a curve raised to the left.

Figure 3B:
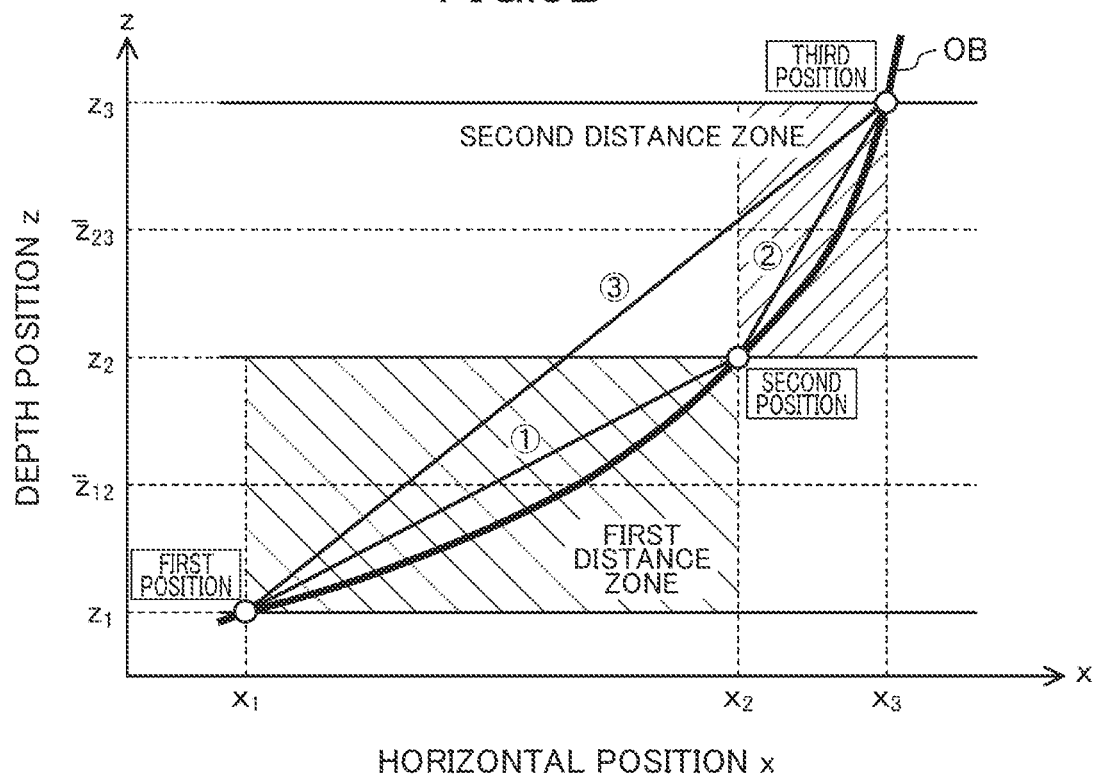

In the example of FIG. 3B, the second position is on the right of the straight line 3. In this case, the straight line (i.e., the straight line 1) connecting the first position and the second position and the straight line (i.e., the straight line 2) connecting the second position and the third position are also on the right of the straight line 3. The location data of the target object OB is generated by interpolating between the first position and the second position and between the second position and the third position, with a function of a curve raised to the right.

<Second Method>

As shown in FIG. 4, a third distance zone is set which includes the boundary position z2 between the first and second distance zones. In the setting of FIG. 4, the third distance zone is interposed between the middle position /z12 of the first distance zone and the middle position /z23 of the second distance zone.

Similarly to the first method, first, second, and third positions with respect to the adjacent first and second distance zones are obtained: the first position is the position of the target object OB at the near end position z1 of the first distance zone; the second position is the position of the target object OB at the boundary position z2 between the first and second distance zones; and the third position is the position of the target object OB at the far end position z3 of the second distance zone. In addition, fourth and fifth positions are obtained: the fourth position is the position of the target object OB at the near end position /z12 of the third distance zone; and the fifth position is the position of the target object OB at the far end position /z23 of the third distance zone.

It is then determined on which side of the straight line (i.e., the straight line 1) connecting the first position and the second position in the horizontal direction the fourth position is located. It is also determined on which side of the straight line (i.e., the straight line 2) connecting the second position and the third position in the horizontal direction the fifth position is located. That is, the location information of the fourth position with respect to the straight line 1 and the location information of the fifth position with respect to the straight line 2 are obtained.

Figure 4A:
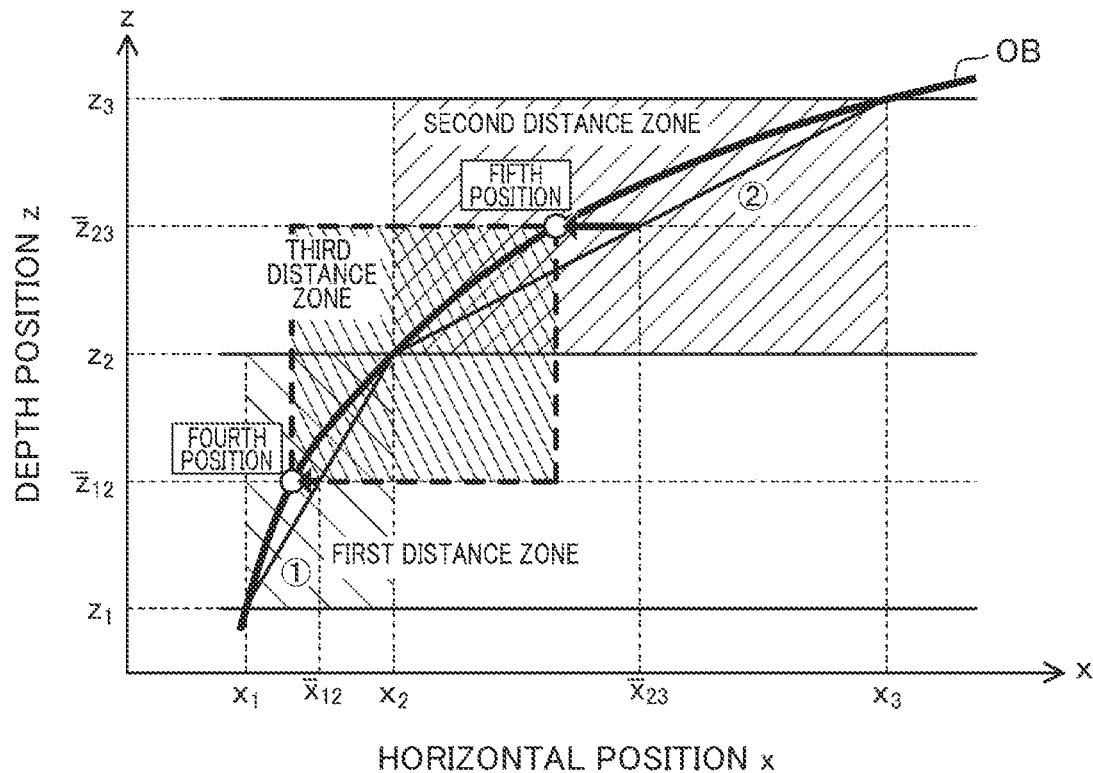
FIGS. 4A and 4B are diagrams showing a second method according to the embodiment.

In the example of FIG. 4A, the fourth position is on the left of the straight line 1. The location data of the target object OB is generated by interpolating between the first position and the fourth position and between the fourth position and the second position, with a function of a curve raised to the left. The fifth position is on the left of the straight line 2. The location data of the target object OB is generated by interpolating between the second position and the fifth position and between the fifth position and the third position, with a function of a curve raised to the left.

Figure 4B:
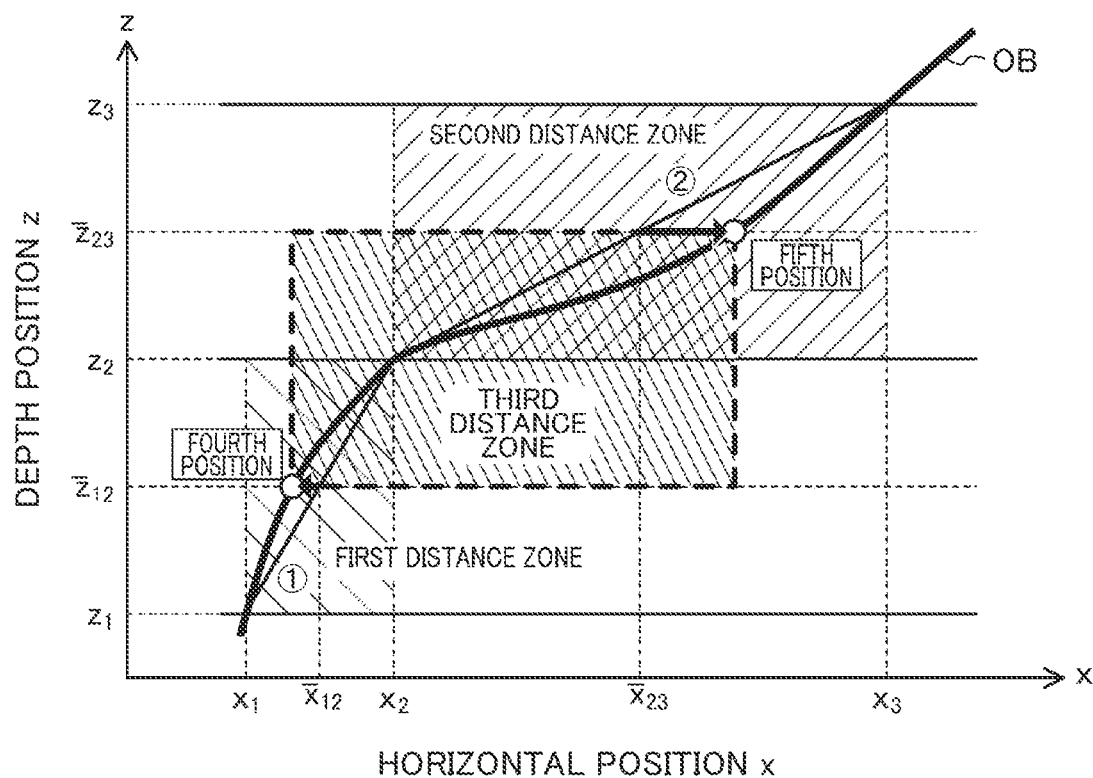

In the example of FIG. 4B, the fourth position is on the left of the straight line 1. The location data of the target object OB is generated by interpolating between the first position and the fourth position and between the fourth position and the second position, with a function of a curve raised to the left. The fifth position is on the right of the straight line 2. The location data of the target object OB is generated by interpolating between the second position and the fifth position and between the fifth position and the third position, with a function of a curve raised to the right.

If, as a comparative example, the straight line 1 and the straight line 2 are regarded as the location data of the target object OB, the curved shape of the target object OB cannot be expressed properly. On the other hand, according to the first method described above, it is determined on which side of the straight line 3 in the horizontal direction the second position is located. According to the second method described above, it is determined on which side of the straight line 1 in the horizontal direction the fourth position is located and on which side of the straight line 2 in the horizontal direction the fifth position is located. The location data of the target object OB is generated by using these determination results, which makes it possible to express the shape and location of the target object OB even in a curved shape more accurately.

The imaging device 1 in FIG. 1 includes the monitor 25 and the specifier 26.

The monitor 25 sets, for the target object OB, a predetermined monitoring area according to a purpose with reference to the location data generated by the methods described above. Setting information for setting the monitoring area can be input from the input section 21. For example, if the target object OB is a railway track, the monitoring area setting information is input based on the structure gauge of the railway track. For example, if the target object OB is a road, the monitoring area setting information is input based on the structure gauge of the road.

FIG. 5 is a diagram showing an example setting of the monitoring area. In FIG. 5, a monitoring area function f(x, y, z) is defined in a three-dimensional space including the x-axis extending in the horizontal direction, the y-axis extending in the vertical direction, and the z-axis extending in the depth direction. If the point (x, y, z) is inside the monitoring area, f(x, y, z)=1. If the point (x, y, z) is outside the monitoring area, f(x, y, z)=0. The monitor 25 determines the monitoring area function f(x, y, z) in accordance with the monitoring area setting information input to the input section 21 with reference to the location data on the target object OB.

When an object that can be an obstacle is recognized in the space to be imaged, the specifier 26 calculates the probability that the object is present inside the monitoring area set with reference to the location data of the target object OB. The specifier 26 then compares the probability to an alarm threshold input to the input section 21 to determine whether to issue an alarm.

Figure 6:
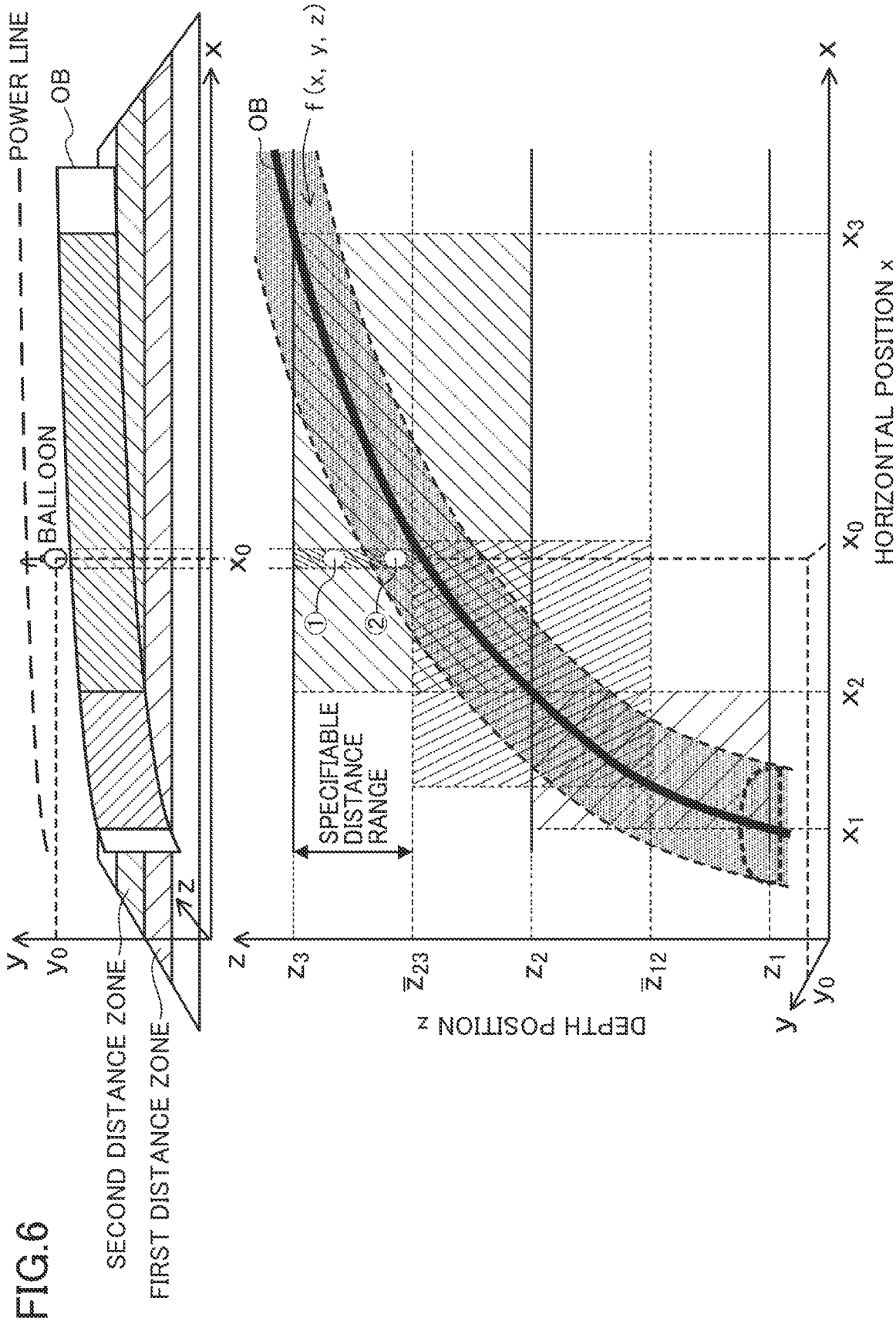
FIG. 6 is a diagram showing a state in which there is an object that can be an obstacle.

FIG. 6 is a diagram showing a state in which a balloon is caught on a power line stretched over the target object OB. Assume that the balloon, which is an example of an object that can be an obstacle, was found to be present in the second distance zone but not to be present in the third distance zone, from the distance image data. That is, it is specified that the balloon is present between the distance /z23 and the distance z3. The balloon at the position (1) is outside the monitoring area. The balloon at the position (2) is inside the monitoring area. The specifier 26 calculates the probability that the balloon is present inside the monitoring area by the following method.

As shown in FIG. 7, with respect, for example, to the representative point (x0, y0) of the balloon on the vertical plane, the probability P(x0, y0) that the balloon is present inside the monitoring area is calculated. This calculation is performed using the following equation.

$$P(x_0, y_0) \equiv \frac{\int_{z_{23}}^{z_3} f(x_0, y_0, z) dz}{\int_{z_{23}}^{z_3} 1 \, dz} = \frac{1}{z_3 - \overline{z}_{23}} \int_{\overline{z}_{23}}^{z_3} f(x_0, y_0, z) dz \qquad [\text{Math 1}]$$

The probability P(x0, y0) is compared to the alarm threshold Palarm to determine whether to issue an alarm.

Alternatively, as shown in FIG. 8, with respect, for example, to the area 6 of the balloon on the vertical plane, the probability P(σ) that the balloon is inside the monitoring area is calculated. This calculation is performed using the following equation.

$$P(\sigma) \equiv \frac{\int\int_\sigma dxdy \int_{\overline{z}_{23}}^{z_3} f(x, y, z) dz}{\int\int_\sigma dxdy \int_{\overline{z}_{23}}^{z_3} 1 \, dz} \qquad [\text{Math 2}]$$

$$= \frac{1}{\sigma(z_3 - \overline{z}_{23})} \int\int_\sigma dxdy \int_{\overline{z}_{23}}^{z_3} f(x, y, z) dz$$

The probability P(σ) is compared to the alarm threshold Palarm to determine whether to issue an alarm.

As described above, according to this embodiment, the first, second, and third positions of the target object OB present across the adjacent first and second distance zones are obtained by the first method: the first position is the position at the near end position of the first distance zone; the second position is the position at the boundary position between the first and second distance zones; and the third position is the position at the far end position of the second distance zone. It is thus possible to obtain the location information of the second position with respect to the straight line connecting the first position and the second position. In addition to the first, second, and third positions, the fourth and fifth positions are obtained by the second method: the fourth position is the position at the near end position of the third distance zone including the boundary position between the first and second distance zones; and the fifth position is the position at the far end position of the third distance zone. It is thus possible to obtain the location information of the fourth position with respect to the straight line connecting the first position and the second position and the location information of the fifth position with respect to the straight line connecting the second position and the third position. The location data of the target object OB is generated by using the location information. It is thus possible to express the location and shape of the target object OB even in a curved shape more precisely and hence possible to generate the location data of the target object OB present across the adjacent first and second distance zones more accurately.

A desired monitoring area can be set around the target object OB. In addition, whether to issue the alarm can be determined accurately when an object that can be an obstacle is recognized in the monitoring area for the target object OB.

In the embodiment described above, interpolation using a function of a curve that is raised to the right or left is employed in generating the location data of the target object OB, but the generation method of the present disclosure is not limited thereto.

Figure 9:
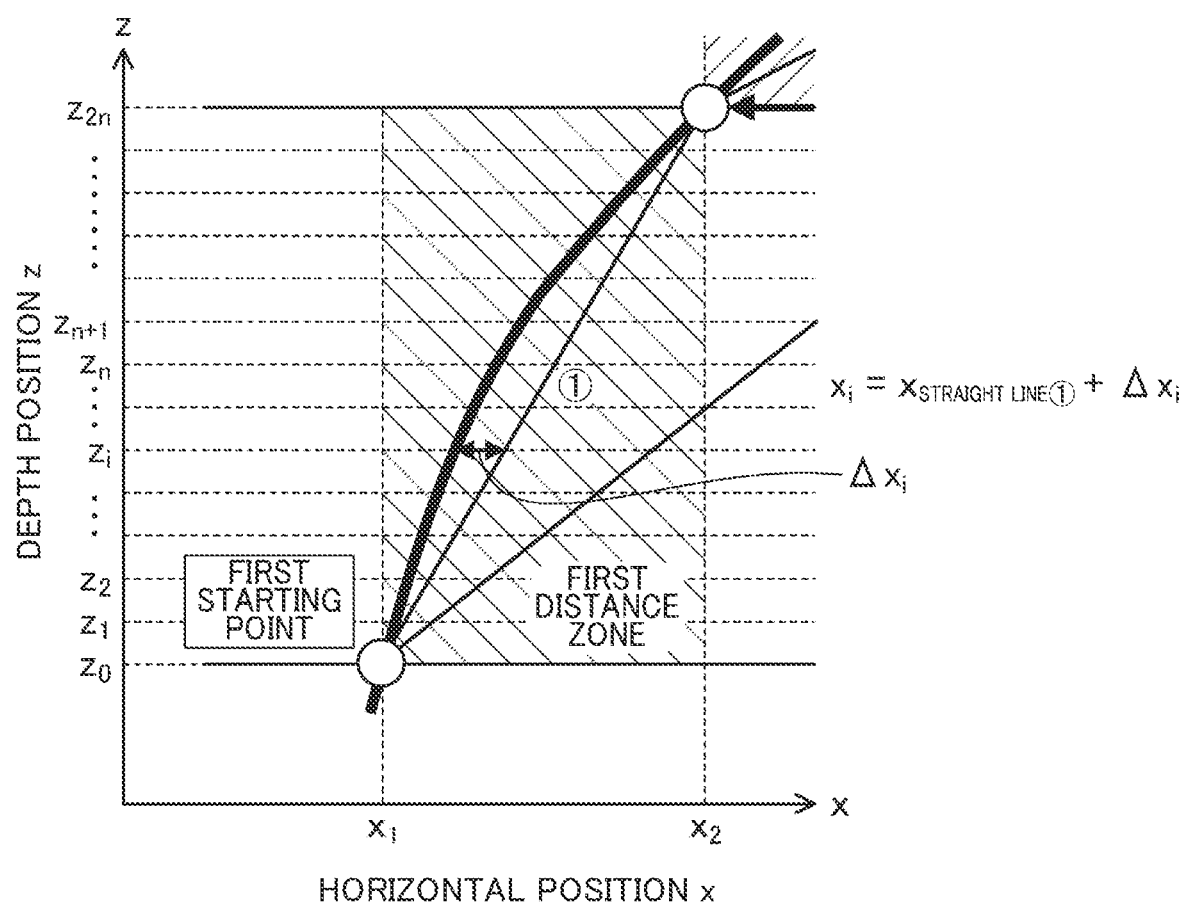
FIG. 9 shows another example method of generating location data of a target object.

FIG. 9 shows another example method of generating location data of the target object OB. Now, assume that the second position was determined to be on the left of the straight line 3 as shown in FIG. 3A. In this case, as shown in FIG. 9, the first distance zone is virtually divided according to z0 to z2n in the depth direction. The horizontal position xi with respect to the distance zi, where i ranges from 0 to 2n, is defined by adding the compensation value $\Delta xi$ to the x-coordinate of the straight line 1. The correction value $\Delta xi$ is determined as follows.

$$\Delta x_i = \begin{cases} \alpha \times i & \text{for } 0 \leq i \leq n \\ \alpha \times (2n - i) & \text{for } n+1 \leq i \leq 2n \end{cases} \quad [\text{Math 3}]$$

Here, $\alpha$ is a negative value when the second position is on the left of the straight line 3 and is a positive value when the second position is on the right of the straight line 3. The location data of the target object OB can be generated in the present disclosure by this method, as well.

INDUSTRIAL APPLICABILITY

According to an imaging device of the present invention, it is possible to monitor the periphery of a target object more accurately by sub-range analysis; therefore, the imaging device of the present invention is useful, for example, in detecting an obstacle on a railroad or a road and in monitoring the location of a person or an object in places, such as a factory, a distribution warehouse, a hospital, a school, and a commercial facility.

What is claimed is:

1. An imaging device comprising:
a detector including a camera for distance measurement; and
a controller configured to divide a target space into a plurality of distance zones based on distances in a depth direction from a reference point and generate, from an output of the detector, distance image data indicating the respective distance zones,
the controller including:
an input section configured to receive setting information of the distance zones, the setting information including the number of the distance zones and a near end position and a far end position of each of the distance zones;
a distance image generator configured to generate the distance image data from the output of the detector, using the setting information of the distance zones input to the input section;
an extractor configured to extract a target object present across first and second distance zones adjacent to each other; and
a calculator configured to calculate, based on the distance image data, target object location data estimating a location and a shape of the target object extracted by the extractor,
the calculator being configured to
obtain a first position, a second position, and a third position on a plane formed by the depth direction and a horizontal direction perpendicular to the depth direction, the first position indicating the position of the target object at the near end position of the first distance zone, the second position indicating the position of the target object at a boundary position between the first and second distance zones, the third position indicating the position of the target object at the far end position of the second distance zone, and
generate, on the plane, the target object location data based on location information of the second position with respect to a straight line connecting the first position and the third position.

2. The imaging device of claim 1, further comprising:
a monitor configured to set a monitoring area based on a monitoring area function input to the input section with reference to the target object location data.

3. The imaging device of claim 2, wherein
the input section allows input of a threshold to issue an alarm due to presence of an obstacle in the monitoring area, and
the imaging device further includes a specifier configured to calculate, when an object that can be an obstacle is recognized in the target space, a probability value by summation of the monitoring area function in the depth direction with respect to a representative point of the object on a vertical plane and compare the probability value to the threshold input to the input section so as to determine whether to issue the alarm.

4. The imaging device of claim 2, wherein
the input section is configured to allow input of a threshold to issue an alarm due to presence of an obstacle in the monitoring area, and
the imaging device further includes a specifier configured to calculate, when an object that can be an obstacle is recognized in the target space, a probability value by summation of the monitoring area function in the depth direction with respect to an area of the object on a vertical plane and compare the probability value to the threshold input to the input section so as to determine whether to issue the alarm.

5. An imaging device comprising:
a detector including a camera for distance measurement; and
a controller configured to divide a target space into a plurality of distance zones based on distances in a depth direction from a reference point and generate, from an output of the detector, distance image data indicating the respective distance zones, the controller including:

an input section configured to receive setting information of the distance zones, the setting information including the number of the distance zones and a near end position and a far end position of each of the distance zones;

a distance image generator configured to generate the distance image data from the output of the detector, using the setting information of the distance zones input to the input section;

an extractor configured to extract a target object present across first and second distance zones adjacent to each other; and a calculator configured to calculate, based on the distance image data, target object location data estimating a location and a shape of the target object extracted by the extractor, the calculator being configured to set a third distance zone including a boundary position between the first and second distance zones, obtain a first position, a second position, a third position, a fourth position, and a fifth position on a plane formed by the depth direction and a horizontal direction perpendicular to the depth direction, the first position indicating the position of the target object at the near end position of the first distance zone, the second position indicating the position of the target object at the boundary position between the first and second distance zones, the third position indicating the location of the target object at the far end position of the second distance zone, the fourth position indicating the position of the target object at the near end position of the third distance zone, the fifth position indicating the position of the target object at the far end position of the third distance zone, and generate, on the plane, the target object location data based on location information of the fourth position with respect to a straight line connecting the first position and the second position and location information of the fifth position with respect to a straight line connecting the second position and the third position.

6. The imaging device of claim 5, further comprising:

a monitor configured to set a monitoring area based on a monitoring area function input to the input section with reference to the target object location data.

7. The imaging device of claim 6, wherein the input section allows input of a threshold to issue an alarm due to presence of an obstacle in the monitoring area, and the imaging device further includes a specifier configured to calculate, when an object that can be an obstacle is recognized in the target space, a probability value by summation of the monitoring area function in the depth direction with respect to a representative point of the object on a vertical plane and compare the probability value to the threshold input to the input section so as to determine whether to issue the alarm.

8. The imaging device of claim 6, wherein the input section is configured to allow input of a threshold to issue an alarm due to presence of an obstacle in the monitoring area, and the imaging device further includes a specifier configured to calculate, when an object that can be an obstacle is recognized in the target space, a probability value by summation of the monitoring area function in the depth direction with respect to an area of the object on a vertical plane and compare the probability value to the threshold input to the input section so as to determine whether to issue the alarm.

* * * * *